US009288329B2

(12) United States Patent
Newton et al.

(10) Patent No.: US 9,288,329 B2
(45) Date of Patent: Mar. 15, 2016

(54) REMOTE CALL CONTROL

(71) Applicant: Securus, Inc., Cary, NC (US)

(72) Inventors: Chris Newton, Raleigh, NC (US); Peter Muldoon, Dallas, TX (US); Justin Gern, Cary, NC (US)

(73) Assignee: Freeus, LLC, Ogden, UT (US)

( * ) Notice: Subject to any disclaimer, the term of this patent is extended or adjusted under 35 U.S.C. 154(b) by 0 days.

(21) Appl. No.: 14/341,465

(22) Filed: Jul. 25, 2014

(65) Prior Publication Data

US 2015/0038104 A1    Feb. 5, 2015

Related U.S. Application Data

(60) Provisional application No. 61/861,876, filed on Aug. 2, 2013.

(51) Int. Cl.
| | |
|---|---|
| *H04M 11/04* | (2006.01) |
| *H04M 3/56* | (2006.01) |
| *H04W 4/16* | (2009.01) |
| *H04W 4/22* | (2009.01) |
| *H04M 3/51* | (2006.01) |
| H04M 3/428 | (2006.01) |

(52) U.S. Cl.
CPC .............. *H04M 3/56* (2013.01); *H04M 3/5116* (2013.01); *H04W 4/16* (2013.01); *H04W 4/22* (2013.01); *H04M 3/428* (2013.01); *H04M 2203/5018* (2013.01); *H04M 2242/04* (2013.01)

(58) Field of Classification Search
CPC ........... H04W 3/56; H04W 4/16; H04W 4/22; H04M 3/428; H04M 3/5116; H04M 2203/5018; H04M 2242/04
See application file for complete search history.

(56) References Cited

U.S. PATENT DOCUMENTS

| | | | | |
|---|---|---|---|---|
| 5,815,550 | A * | 9/1998 | Miller | H04M 3/56 340/531 |
| 6,052,574 | A * | 4/2000 | Smith, Jr. | H04W 76/007 455/404.2 |
| 6,292,542 | B1 * | 9/2001 | Bilder | H04M 11/04 379/201.01 |
| 6,340,928 | B1 * | 1/2002 | McCurdy | G08G 1/205 340/436 |
| 6,807,564 | B1 * | 10/2004 | Zellner | G08B 25/016 370/310 |
| 2003/0050039 | A1 * | 3/2003 | Baba | H04M 1/72538 455/404.1 |
| 2004/0105529 | A1 * | 6/2004 | Salvucci | H04M 3/51 379/45 |
| 2005/0136885 | A1 * | 6/2005 | Kaltsukis | 455/404.1 |
| 2014/0199946 | A1 * | 7/2014 | Flippo et al. | 455/67.14 |

* cited by examiner

*Primary Examiner* — Mahendra Patel
(74) *Attorney, Agent, or Firm* — Baker & Hostetler LLP

(57) ABSTRACT

A communications device comprises a processor, a memory device coupled to processor, one or more wireless transmitters, one or more wireless receivers, an output component, and an input component. The memory device includes executable instructions to enable the processor to perform the following steps: initiate a call with a first remote device; receive, from the first remote device, an indication of a phone number that is programmed in the communications device; initiate a call with a second remote device associated with the phone number that is programmed in the communications device; and cause the communications device, the first remote device, and the second remote device to be placed into a conference call, or to place the first remote device on hold while the communications device provides information to the second remote device. The communications device may be configured as an emergency pendant device, mobile phone, or any kind of communication device that can detect a signal to trigger either the sequence to conference call or place on hold and make a second call.

10 Claims, 3 Drawing Sheets

REMOTE CALL CONTROL

CROSS REFERENCE TO RELATED APPLICATIONS

The present application claims the benefit of U.S. Provisional Application No. 61/861,876, filed Aug. 2, 2013, entitled "Remote Conference Call Control," which is hereby incorporated by reference in its entirety.

TECHNICAL FIELD

The present disclosure relates generally to the field of telecommunications, and more specifically to a communications device with remote conference call control capabilities.

SUMMARY

According to an illustrative embodiment of the present invention, a communications device comprises a processor, a memory device coupled to processor, one or more wireless transmitters, one or more wireless receivers, an output component, and an input component. The memory device includes executable instructions to enable the processor to perform the following steps: initiate a call with a first remote device; receive, from the first remote device, an indication of a phone number that is programmed in the communications device; initiate a call with a second remote device associated with the phone number that is programmed in the communications device; and cause the communications device, the first device, and the second device to be placed into a conference call.

The communications device may be configured as an emergency pendant device, as a mobile phone, or any kind of communication device that can detect a signal to trigger either the sequence to conference call or place on hold and make a second call. Other features of the invention are described below.

DETAILED DESCRIPTION OF ILLUSTRATIVE EMBODIMENTS

There are many different technologies in use today that provide communication over existing cellular networks. These technologies include but are not limited to GPRS and SMS. These communication technologies are used to transmit data between a device and server. One challenge of these technologies has been the ability to transmit data over a cellular network while the device is also in a 2-way call. Different carrier networks and technologies have different strengths and limitations and some technologies do allow for devices to transmit data and voice simultaneously.

A typical application that may be limited by technology would be an emergency response device operating on a M2M cellular infrastructure. One example of such an emergency response device is an emergency pendant that dials a third party, such as an emergency call center, when the user presses a button for a predetermined amount of time.

In one embodiment of the invention, the emergency response device can be either locally or remotely configured with a list of conference call numbers that are dialed when the third party (e.g., the emergency call center operator) presses a sequence of keys on a touch tone phone pad. The conference call numbers may include but are not limited to other emergency call centers, caregivers, and 911. The sequence of numbers pressed by the operator may be used to select which of the programmed numbers to dial. The conference call allows three parties to be engaged on a single call together without any interruptions or disconnects.

For example, an elderly person is provided an emergency pendant that is programmed to dial an emergency call center when the device is activated by the user. The device is also preconfigured to remotely conference in 911 (or other emergency response phone number) when the emergency call center operator presses "111#" on her touch tone keypad. This allows for the user of the device, emergency call center operator, and 911 operator to be connected together via a conference call.

Figure 1:
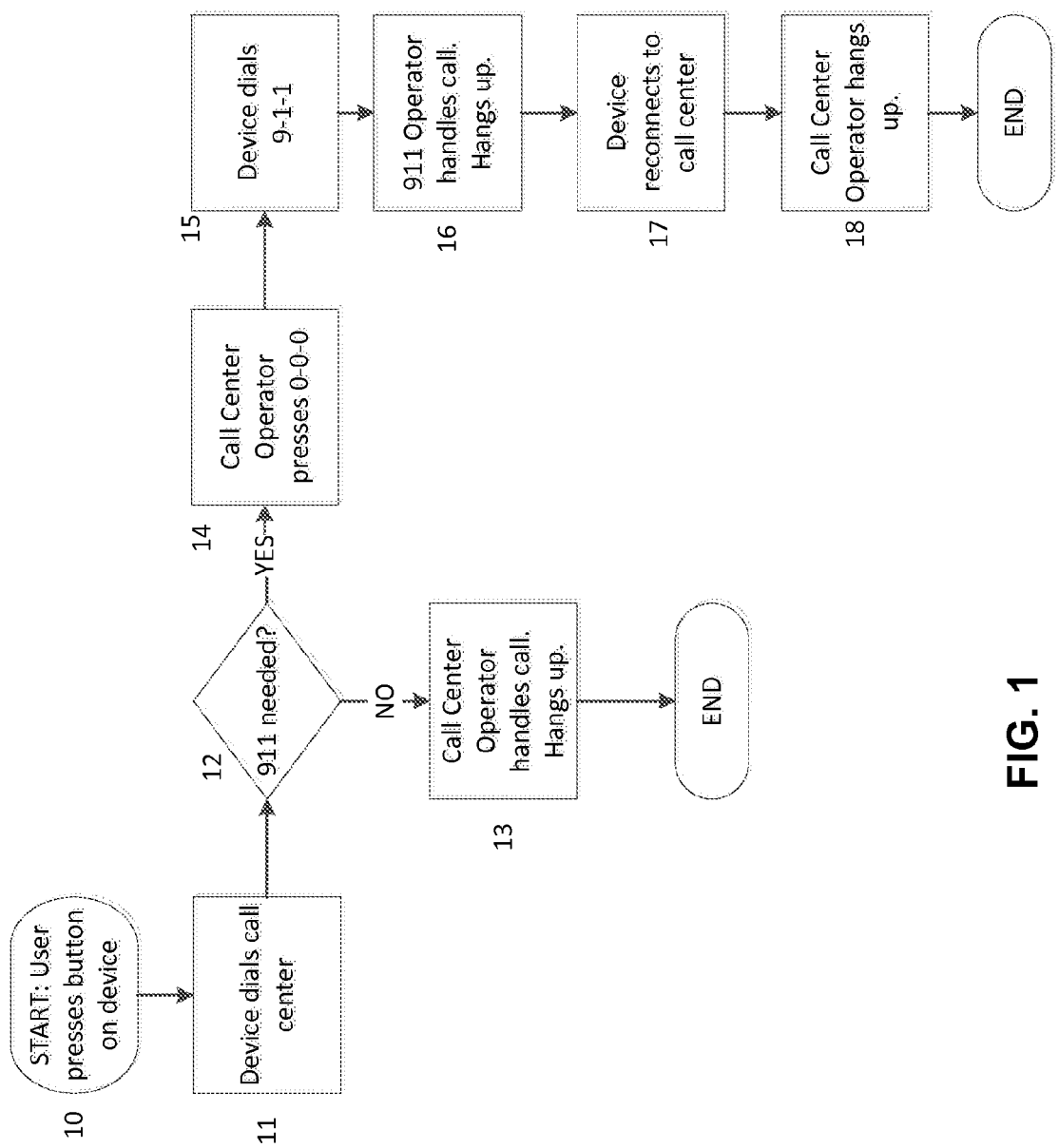
FIG. 1 is a flowchart of an illustrative embodiment of a method for emergency call handling in accordance with the present invention. In this embodiment, a first call from the device to a call center is placed on hold while the device calls a public service answering point (i.e., emergency services dispatcher).

Referring to FIG. 1, a user may press a button or suitable mechanism to initiate a call on a pendant device or other device (step 10). Such as a device may generally include one or more components depicted in FIG. 3 (described further below). The button may be implemented in hardware or software. Furthermore, the call may be initiated automatically in response to some other stimulus of condition without the pressing of a button or other manual activation. However, automatic initiation is not required. The device may then dial a call center or other recipient programmed in the pendant device (step 11). The call center may then determine if a 911 call or other emergency call is needed (step 12). If a 911 call is not needed, then the call center operator may handle the call and terminate the call when completed (step 13). If a 911 call is needed, then the call center operator may press a sequence of keys on the operator's device (step 14). The tones generated in response to the sequence of keys may cause the pendant device to call 911 (step 15). The 911 operator may then handle the call and respond to the issue (step 16). In some embodiments, the call center operator may be placed on hold during this time. If allowed, the call center operator may be brought into the call and a three-way conference call may be started. Otherwise, after the 911 call is completed, the pendant device may reconnect to the call center (step 17). After the call center operator has handled any further issues, then the call with the call center operator is completed (step 18).

Figure 2:
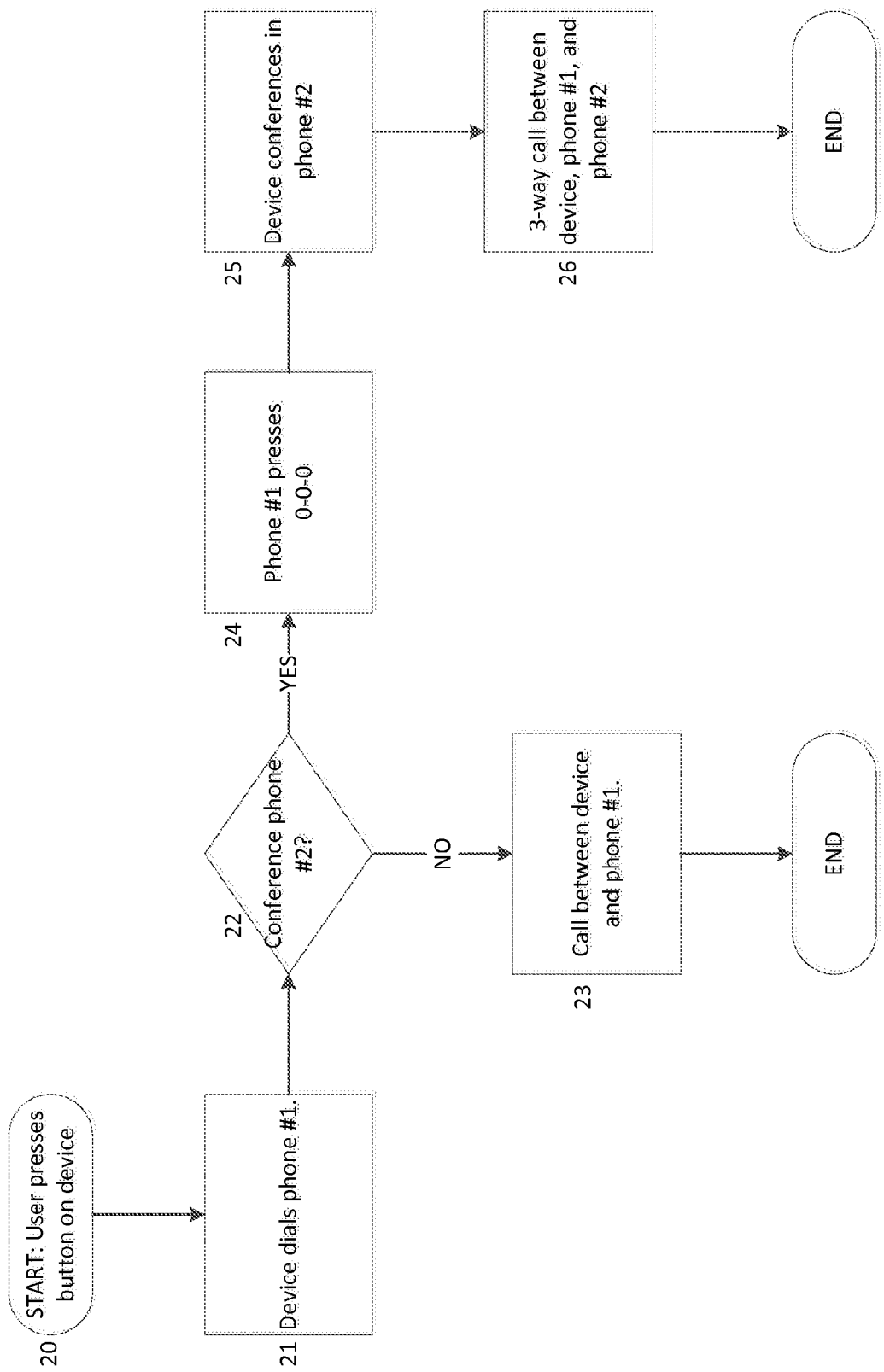
FIG. 2 is a flowchart of another embodiment of a method in accordance with the present invention. In this embodiment, the device establishes a conference call between a call center operator and emergency services dispatcher.

Referring to FIG. 2, in another example embodiment, a user may press a button or suitable mechanism to initiate a call on a pendant device or other device (step 20). Such a device may generally include one or more components depicted in FIG. 3 (described further below). The button may be implemented in hardware or software. Furthermore, the call may be initiated automatically in response to some other stimulus of condition without the pressing of a button or other manual activation. However, automatic initiation is not required. The device may then dial a first phone number that is programmed in the pendant device (step 21). The recipient at the first phone number may then determine if a second call is needed (step 22). If a second call is not needed, then the recipient at the first phone number may handle the call and terminate the call when completed (step 23). If a second call is needed, then the recipient at the first phone number may press a sequence of keys on the recipient's device (step 24). The tones generated in response to the sequence of keys may cause the pendant device to call a second phone number that is programmed in the pendant device (step 25). The pendant device and the first and second phone numbers may then be placed into a three-way conference call (step 26). In some embodiments, either the device at the first phone number or the device at the second phone number may be placed on hold until a conference call is initiated.

In some embodiments, the sequence of keys may generate dual-tone multi-frequency (DTMF) signals (also referred to as touch tone). In other embodiments, the sequence of keys may generate a command that may be transmitted to the pendant device, where the command is received by the pendant device and where the command indicates a phone number that is programmed in the pendant device. Additionally, the invention may be implemented on devices other than a pendant device. For example, the invention may be implemented on any communications device such as a mobile phone.

Figure 3:
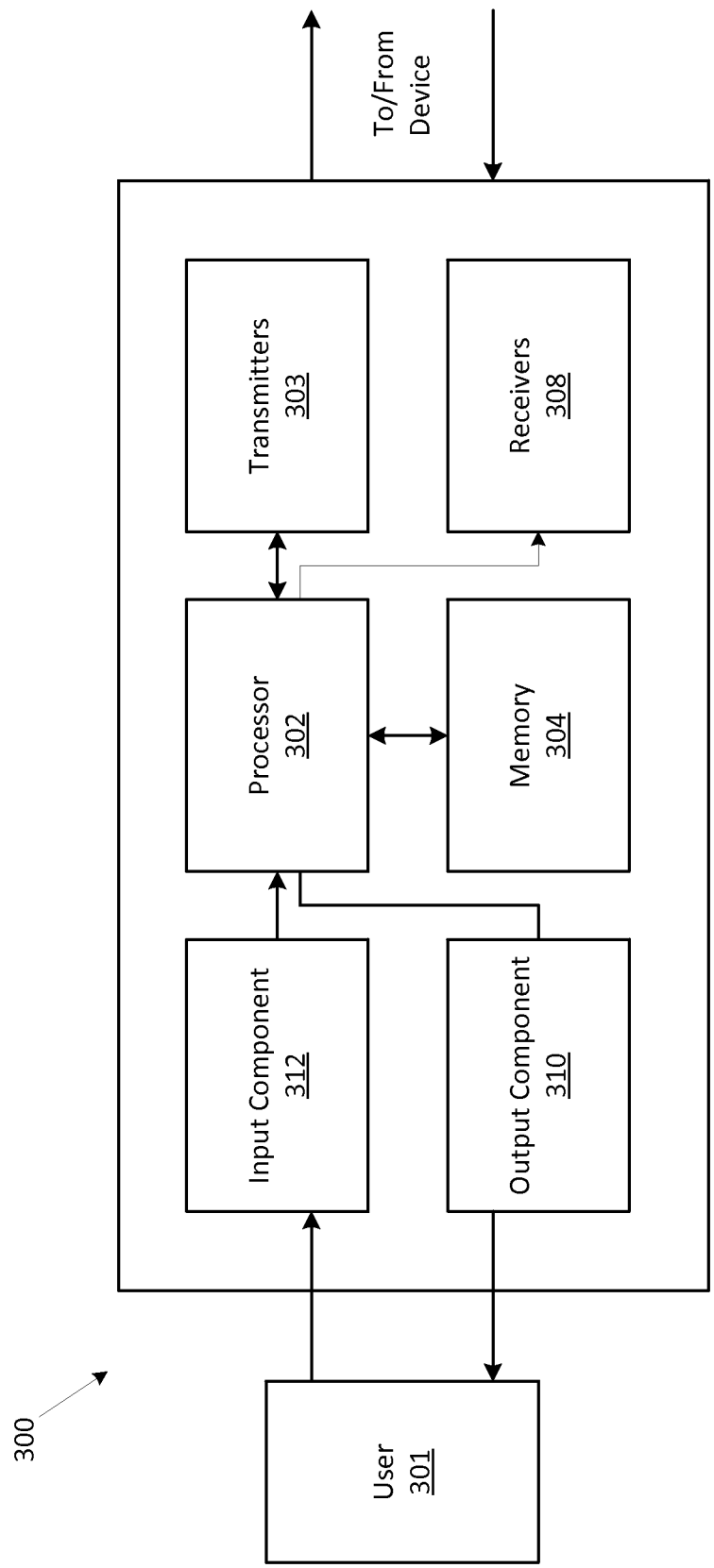
FIG. 3 is a block diagram of a communications device in accordance with the present invention.

Referring to FIG. 3, illustrated is a diagram of device 300 that may be used in various embodiments. A device 300 may include a processor 302, a memory device 304 coupled to processor 302, one or more wireless transmitters 303, one or more wireless receivers 308, an output component 310, and an input component 312. Processor 302 may include any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein.

Memory device 304 may include a non-transitory computer readable storage medium, such as random access memory (RAM), flash memory, a hard disk drive, a solid state drive, a diskette, a flash drive, a compact disc, a digital video disc, and/or any suitable memory. In one embodiment, memory device 304 may include data and/or instructions embodying aspects of the disclosure that are executable by processor 302 to enable processor 302 to perform the functions described herein. Additionally, the memory device 304 may comprise an operation system and applications.

Wireless transmitters 303 may be configured to transmit control signals and data signals over a communications network. Wireless receivers 308 may be configured to receive control signals and data signals over the communications network. Device 300 may also include at least one output component 310 for presenting information to a user 301. Output component 310 may be any component capable of conveying information to user 301. In some implementations, output component 310 may include an output adapter such as a video adapter and/or an audio adapter or the like. An output adapter is operatively coupled to processor 302 and may be configured to be operatively coupled to an output device such as a display device. In some implementations, at least one such display device may be included with output component 310.

Device 300 may include at least one input component 312 for receiving input from user 301. Input component 312 may include, for example, a keyboard or keypad, a pointing device, a mouse, a stylus, a touch sensitive panel (e.g., a touch pad or a touch screen), an audio input device, or the like. A single component such as a touch screen may function as both an output device of output component 310 and input component 312. In some implementations, output component 310 and/or input component 312 may include an adapter for communicating data and/or instructions between device 300 and a computer connected thereto.

In some embodiments, memory device 304 may be one embodiment of a computer-accessible medium configured to store program instructions and data as described above. However, in other embodiments, program instructions and/or data may be received, sent or stored upon different types of computer-accessible media. A computer-accessible medium may include non-transitory storage media or memory media such as magnetic or optical media, e.g., disk or DVD/CD. A non-transitory computer-accessible storage medium may also include any volatile or non-volatile media such as RAM (e.g. SDRAM, DDR SDRAM, RDRAM, SRAM, etc.), ROM, etc., that may be included in some embodiments of device 300 as memory device 304 or another type of memory. Portions or all of multiple devices such as those illustrated in FIG. 3 may be used to implement the described functionality in various embodiments.

We claim:

1. A communications device, comprising:
   a processor, a memory device coupled to the processor, one or more wireless transmitters, one or more wireless receivers, an output component, and an input component;
   wherein the memory device includes executable instructions and a plurality of stored phone numbers, including 911, to enable the processor to perform the following steps:
   initiate a call with a first remote device;
   receive, from the first remote device, an indication of a phone number that is programmed in the communications device;
   determine whether or not the phone number is 911;
   if the phone number is 911, then initiate a 911 call with the first remote device on hold; and
   if the phone number is not 911, then initiate a call with a second remote device associated with the phone number that is programmed in the communications device, and cause the communications device, the first remote device, and the second remote device to be placed into a conference call;
   wherein the communications device is configured as a pendant device, and the first remote device is associated with a call center.

2. The communications device recited in claim 1, wherein the communications device is configured as an emergency pendant device.

3. The communications device recited in claim 1, wherein the communications device is configured as a mobile phone.

4. A method employed by a communications device including a memory for storing a plurality of phone numbers, including 911, comprising:
   initiating a call with a first remote device;
   receiving, from the first remote device, an indication of a phone number that is programmed in the communications device;
   determining whether or not the phone number is 911;
   if the phone number is 911, then initiating a 911 call with the first remote device on hold; and
   if the phone number is not 911, then initiating a call with a second remote device associated with the phone number that is programmed in the communications device, and causing the communications device, the first remote device, and the second remote device to be placed into a conference call;

wherein the communications device is configured as a pendant device, and the first remote device is associated with a call center.

5. The method recited in claim 4, wherein the communications device is configured as an emergency pendant device.

6. The method recited in claim 4, wherein the communications device is configured as a mobile phone.

7. The communications device recited in claim 1, wherein the 911 call is initiated in response to tones generated by the first remote device.

8. The communications device recited in claim 1, wherein the 911 call is initiated in response to a command generated by the first remote device.

9. The method recited in claim 4, wherein the 911 call is initiated in response to tones generated by the first remote device, wherein said tones are generated when a user of the first remote device presses a sequence of keys.

10. The method recited in claim 4, wherein the 911 call is initiated in response to a command generated by the first remote device, wherein said command is generated when a user of the first remote device presses a sequence of keys.

\* \* \* \* \*